(12) United States Patent
Ogawa (10) Patent No.: US 6,984,819 B2
(45) Date of Patent: Jan. 10, 2006

(54) OPTICAL CONVERTING TYPE ULTRASONIC RECEIVING APPARATUS

(75) Inventor: Eiji Ogawa, Minami-Ashigara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 558 days.

(21) Appl. No.: 10/140,262

(22) Filed: May 8, 2002

(65) Prior Publication Data

US 2002/0166955 A1 Nov. 14, 2002

(30) Foreign Application Priority Data

May 14, 2001 (JP) .................................. 2001-142708
Sep. 27, 2001 (JP) .................................. 2001-296344
Apr. 10, 2002 (JP) .................................. 2002-107850

(51) Int. Cl.
G01J 1/34 (2006.01)

(52) U.S. Cl. .................... 250/227.21; 385/7; 385/10
(58) Field of Classification Search ............ 250/227.21, 250/227.11, 227.14; 385/1–13; 359/566; 356/477; 73/655, 657, 570; 600/437

See application file for complete search history.

(56) References Cited

U.S. PATENT DOCUMENTS 5,539,571 A * 7/1996 Welch et al. ................ 359/344
5,684,592 A * 11/1997 Mitchell et al. ............. 356/493
6,057,927 A * 5/2000 Levesque et al. ........... 356/432
6,659,957 B1 * 12/2003 Vardi et al. .................. 600/467

OTHER PUBLICATIONS

Takahashi, Nobuaki, et al., "Underwater Acoustic Sensor with Fiber Bragg Grating", Optical Review, vol. 4, No. 6 (1997) p. 691–694.

Uno, Yasuto et al., "Pressure Sensitivity of a Fiber–Optic Microprobe for High Frequency Ultrasonic Field", Jpn. J. Appl. Phys. vol. 38 (1999) pp. 3120–3123.

* cited by examiner

Primary Examiner—Thanh X. Luu
Assistant Examiner—Seung C. Sohn
(74) Attorney, Agent, or Firm—Sughrue Mion, PLLC

(57) ABSTRACT

An ultrasonic receiving apparatus is equipped with such a condition capable of obtaining superior sensitivities. This ultrasonic receiving apparatus includes: an ultrasonic detecting element for modulating light on the basis of ultrasonic waves applied thereto, the ultrasonic detecting element including an ultrasonic sensible portion having a length not larger than ¾ of a wavelength of ultrasonic waves propagated therethrough; and a photodetector for detecting light output from the ultrasonic detecting element.

17 Claims, 11 Drawing Sheets

OPTICAL CONVERTING TYPE ULTRASONIC RECEIVING APPARATUS

BACKGROUND OF THE INVENTION

1. Field of the Invention

The present invention generally relates to an ultrasonic receiving apparatus. More specifically, the present invention is directed to an optical converting type ultrasonic receiving apparatus capable of detecting ultrasonic waves by using light.

2. Description of a Related Art

Conventionally, when three-dimensional images of an object to be inspected are acquired by employing ultrasonic waves (beams), a plurality of two-dimensional images as to sectional views along depth directions thereof have been acquired, and then the acquired two-dimensional images have been synthesized with each other. This two-dimensional image is acquired in such a manner that an object to be inspected is scanned by employing a one-dimensional sensor array equipped with a position sensor. Furthermore, a plurality of two-dimensional images acquired in a time sequential manner are synthesized with each other, so that a three-dimensional image of this object can be obtained.

However, in accordance with this image acquisition method, there is a time lag along the scanning direction of the one-dimensional sensor array. As a result, sectional images acquired at different time instants are synthesized with each other, so that a synthesized image would become burring. As a consequence, this three-dimensional image acquisition method is not suitable for imaging an object having motion such as a living object or a biological body.

In order to acquire a three-dimensional image in real time, while such a two-dimensional sensor array is necessary required by which a two-dimensional image of an object can be acquired by employing a sensor array without scanning the object, development of such a sensor array is strongly desired.

Generally speaking, in ultrasonic diagnosing apparatus, as elements used to transmit and receive ultrasonic waves (namely, transducer elements or ultrasonic probes), piezoelectric ceramics typically known as PZT (lead titanate zirconate), and also polymer piezoelectric elements such as PVDF (polyvinyl difluoride) have been employed. While these elements are employed, such a method of manufacturing the above-described two-dimensional array has been considered. However, in the case where the above-explained ultrasonic transmission/reception piezoelectric elements such as PZT and PVDF are employed, theses piezoelectric elements are necessarily required to be processed in very fine modes, and furthermore, wiring works for a very large number of very fine piezoelectric elements are also required. Therefore, it is practically difficult to manufacture these piezoelectric elements in very finer modes and also in higher integration degrees, as compared with those of the presently-available piezoelectric elements. Also, even if these technical difficulties may be solved in near future, then other problems will apparently occur. That is, crosstalk among these piezoelectric elements will be increased, S/N ratios will be deteriorated due to increases of electric impedance caused by very fine wiring lines, and/or electrode portions of very fine piezoelectric elements will be readily destroyed. As a consequence, such a two-dimensional sensor array with employment of the above-described PZT and PVDF can be hardly realized.

On the other hand, as ultrasonic sensors without using such piezoelectric materials such as PZT, another detecting type of sensor (will be referred to an "optical detecting type" hereinafter) is known by which ultrasonic signals are converted into optical signals, while utilizing optical fibers. As such optical detecting type ultrasonic sensors, the following sensors have been reported, namely, ultrasonic sensor with employment of a fiber Bragg grating (will be abbreviated as an "FBG" hereinafter, see "Underwater Acoustic Sensor with Fiber Bragg Grating" written by TAKAHASHI et. al. of National Defense Academy in Japan, OPTICAL REVIEW Vol. 4, No. 6, in 1997. pages 691 to 694), and an ultrasonic sensor with employment of a Fabry-Pérot resonator (will be abbreviated as an "FPR" hereinafter) structure (see "Fabrication and Performance of a Fiber Optic Micro-Probe for Megahertz Ultrasonic Field Measurements" written by UNO et. al., of Tokyo Institute of Technology, T. IEE Japan, Vol. 118-E, No. 11, in 1998).

The above-mentioned document written by TAKAHASHI et. al. clearly describes such a fact that when the fiber Bragg grating is employed as the ultrasonic sensor, this ultrasonic sensor could sense ultrasonic waves in such a relatively low frequency range defined on the order of 20 kHz at a certain sensitivity. However, this document never describes such ultrasonic waves in megahertz frequency ranges which are used in actual ultrasonic diagnosing operations. As a consequence, in order that such an ultrasonic sensor is actually available in ultrasonic diagnosing operations, ultrasonic operations with respect to such ultrasonic waves in frequency ranges higher than that of the ultrasonic sensor written as the example in this document should be confirmed. Also, if required, various conditions for achieving better sensitivities in such higher frequency ranges should also be acquired.

SUMMARY OF THE INVENTION

The present invention has been made to solve the above-described problems, and therefore, has an object to provide such an optical converting type ultrasonic receiving apparatus with employment of an ultrasonic detecting element capable of satisfying a condition under which a better ultrasonic sensitivity thereof can be obtained.

To solve the above-explained problems, an ultrasonic receiving apparatus, according to the present invention, comprises an ultrasonic detecting element for modulating light on the basis of ultrasonic waves applied thereto, the ultrasonic detecting element including an ultrasonic sensible portion having a length not larger than ¾ of a wavelength of ultrasonic waves propagated therethrough; and a photodetector for detecting light output from the ultrasonic detecting element.

In accordance with the present invention, since the length of the ultrasonic sensible portion is limited on the basis of the wavelength of the ultrasonic waves propagated through this ultrasonic sensible portion, such an ultrasonic receiving apparatus can be obtained which has the higher sensitivity with respect to the ultrasonic waves to be detected.

BRIEF DESCRIPTION OF THE DRAWINGS

For a better understanding of the present invention, reference is made of a detailed description in conjunction with the accompanying drawings, in which.

DESCRIPTION OF THE PREFERRED EMBODIMENTS

Referring now to drawings, various preferred embodiments of the present invention will be described in detail. It should be understood that the same reference numerals will be employed as those for denoting the same, or similar structural elements and explanation thereof is omitted.

Figure 1:
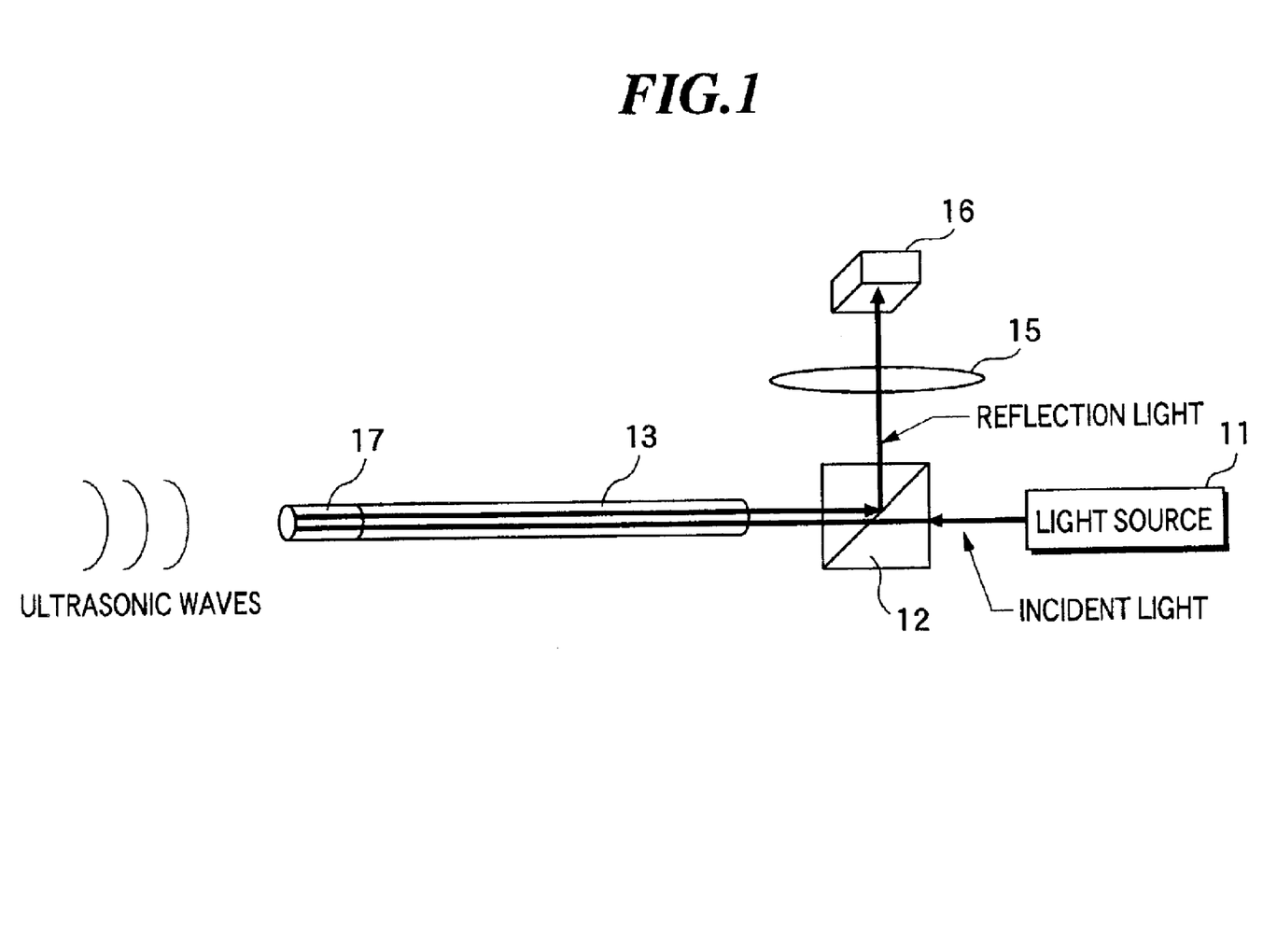
FIG. 1 is a diagram for illustratively indicating a basic idea of an ultrasonic receiving apparatus according to a first embodiment of the present invention.

FIG. 1 illustratively shows basic idea of an ultrasonic receiving apparatus according to a first embodiment of the present invention. This ultrasonic receiving apparatus contains a light source 11 used to generate single mode laser light having a single wavelength defined from, preferably, 500 nm to 1600 nm. The laser light (beam) generated from the light source 11 is entered into an beam separator 12, while this beam separator 12 is constituted by employing a half mirror, an optical circulator, or a polarization beam splitter, or the like. The beam separator 12 may cause incident light entered from a first direction to pass therethrough along a second direction, and also may cause reflection light returned from the second direction to pass therethrough along a third direction different from this first direction. In this first embodiment, the half mirror is employed as the beam separator 12. The half mirror may cause the incident light to pass therethrough, and may cause the reflection light returned from the direction opposite to the incident light to reflect thereon along such a direction defined at an angle of substantially 90 degrees with respect to the incident direction.

The light which has been derived from the optical source 11 and then has penetrated the beam separator 12 is entered into the optical fiber 13. This optical fiber 13 may be preferably made as a single mode fiber.

At a tip portion of this optical fiber 13, a Bragg grating portion containing a Bragg grating mechanism is formed as an ultrasonic sensible portion, by which an ultrasonic detecting element 17 is constituted.

Figure 2:
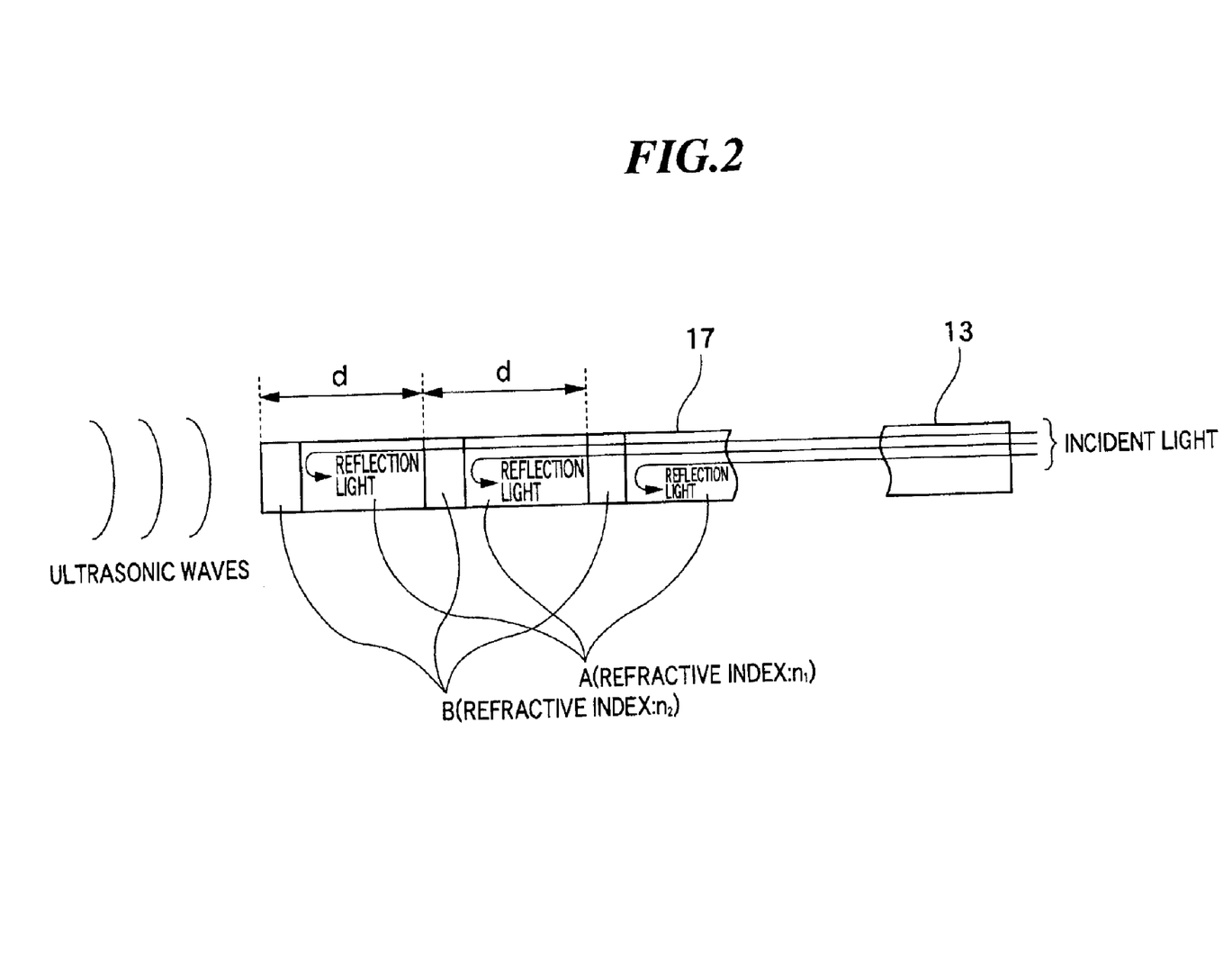
FIG. 2 is a diagram for illustratively indicating an ultrasonic detecting element of FIG. 1 in an enlarging manner.

FIG. 2 is a diagram for showing the ultrasonic detecting element of FIG. 1 in an enlarging manner. The Bragg grating portion is constructed in such a manner that two sorts of material layers (namely, optical transmission media) having different refractive indexes are mutually overlapped with each other in a predetermined pitch capable of satisfying the Bragg's reflection condition, while a total number of these overlapped material layers is selected to be several thousands. That is, FIG. 2 indicates a material layer "A" having a refractive index "$n_1$", and another material layer "B" having another refractive index "$n_2$". Assuming now that the pitch (interval) between periodic structures of these material layers is selected to be "d", and also, a wavelength of incident light of this ultrasonic detecting element 17 is selected to be "λ", the Bragg's reflection condition is expressed by the following formula (1). It should be noted that symbol "m" indicates an arbitrary integer in this formula (1).

$$2d \times \sin\theta = m\lambda \tag{1}$$

In this formula (1), symbol "θ" represents an incident angle which is measured from an incident plane. Assuming now that the incident angle "θ" is equal to $\pi/2$, the below-mentioned formula (2) may be obtained:

$$2d = m\lambda \tag{2}$$

The Bragg's grating portion may selectively reflect a specific wavelength component of the incident light capable of satisfying this Bragg's reflection condition, and may penetrate therethrough other wavelength components thereof.

When ultrasonic waves (ultrasonic beams) are propagated through the above-described Bragg grating portion, this Bragg grating portion is distorted to change the pitch "d" of the above-described periodic structure. As a result, the selectively reflected wavelength component "λ" is changed. Within a reflection characteristic of the Bragg grating portion, an inclined band where reflectance is varied is present before/after a center wavelength at which reflectance becomes the largest value (namely, transmittance becomes low). While detection light having a center wavelength in a range of this inclined band is entered into the Bragg grating portion, ultrasonic waves are applied to this Bragg grating portion. As a result, a change in intensity of reflection light (otherwise, transmission light) can be monitored, which occurs in response to strengths of the applied ultrasonic waves. Thus, the intensity of the applied ultrasonic waves can be measured by converting this intensity of the reflection light.

Referring back to FIG. 1, light entered into the optical fiber 13 is modulated by the Bragg grating portion to be reflected. Then, this reflection light is again entered into the beam separator 12 by which the propagation path (travel path) of this reflection light is changed. The light derived from this beam separator 12 is entered into an photodetector 16, while this photodetector 16 is constructed of a CCD (charge-coupled device), an MOS (metal oxide semiconductor) type sensor, a PD (photodiode), or the like. In this case, this reflection light may be directly entered into the photodetector 16. Alternatively, this reflection light may be entered via an optical fiber, or the like into this photodetector 16. Furthermore, while an image focusing system 15 such as a lens, or the like is provided at a post stage of the beam separator 12, the reflection light may be focused via this image focusing system 15 into the photodetector 16.

In this case, generally speaking, a Bragg grating portion may be easily manufactured, while sensitivities of this Bragg grating portion may be made high. However, Bragg gratings, which are commercially available, cannot be directly employed as high-sensitive sensors to be used in ultrasonic diagnosing fields. Ultrasonic sensors with employment of fiber Bragg gratings are described in, for instance, the document "Underwater Acoustic Sensor with Fiber Bragg Grating" written by TAKAHASHI et. al., of National Defense Academy in Japan, OPTICAL REVIEW vol. 4, No. 6, pages 691 to 694, in 1997. This document clearly describes that the fiber Bragg grating may achieve certain available sensitivities with respect to such ultrasonic waves within the lower frequency range of approximately 20 kHz. However, this document never describes ultrasonic waves within frequency ranges of megahertz, which are normally utilized in ultrasonic diagnosing fields.

Under such a circumstance, Inventors of the present invention could confirm operations of Bragg gratings which are commercially available with respect to ultrasonic waves in frequency ranges higher than 20 kHz, while these Bragg gratings were applied to the ultrasonic receiving apparatus as shown in FIG. 1. As a result of this operation confirmation, the following fact could be confirmed. That is, sufficiently high sensitivities could not be achieved in such Bragg gratings with respect to ultrasonic waves entered from an axial direction thereof. Also, while length of the Bragg grating portion was changed, various operations of these Bragg grating portions having the different lengths could be confirmed as follows: That is, in such a case that a length of a Bragg grating portion was larger than approximately ¾ of an ultrasonic wavelength "$\lambda_s$" in the Bragg grating portion, which is expressed by the below-mentioned formula (3), the detected waveform was distorted on the lower frequency side, as compared with the waveform of the actually received ultrasonic wave, and the sensitivity of the sensor was lowered.

(ultrasonic wavelength $\lambda_s$)=(sound velocity in Bragg grating portion)/(frequency of ultrasonic wave)     (3).

Now, this operation confirmation will be described in a more concrete manner.

First, while a length of a Bragg grating portion (sensor length) was changed, experimental operations of comparing operations of Bragg gratings were carried out. In this experiment, such ultrasonic waves having a frequency range of 3.5 MHz generated by employing PZT were applied to two sorts of Bragg grating portions having one sensor length of ¾ $\lambda_s$, and also, another sensor length of 3/2 $\lambda_s$. In this case, waveforms of detection signals output from the above-described two sorts of sensors are shown in FIG. 3A and FIG. 3B, respectively.

Figure 3A:
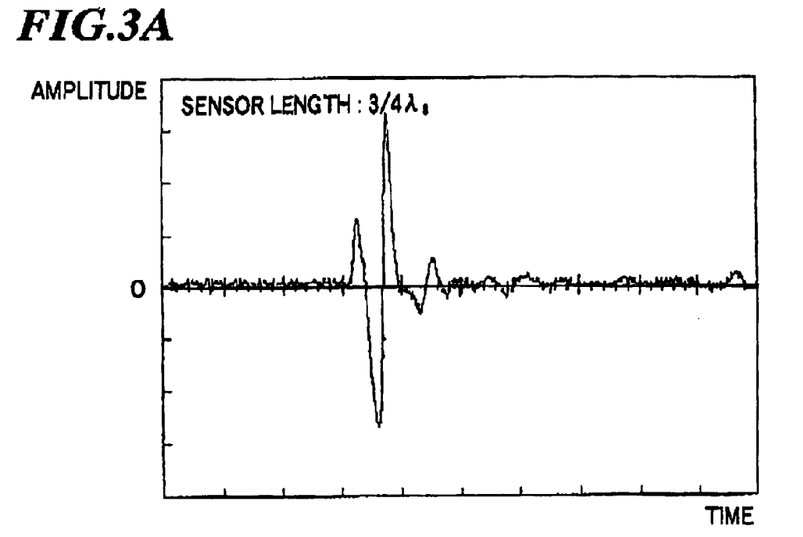
FIG. 3A and FIG. 3B are graphic representations for representing experimental results obtained in such a manner that while ultrasonic waves are applied to sensors having different sensor lengths, detection signals output from these sensors are observed.
Figure 3B:
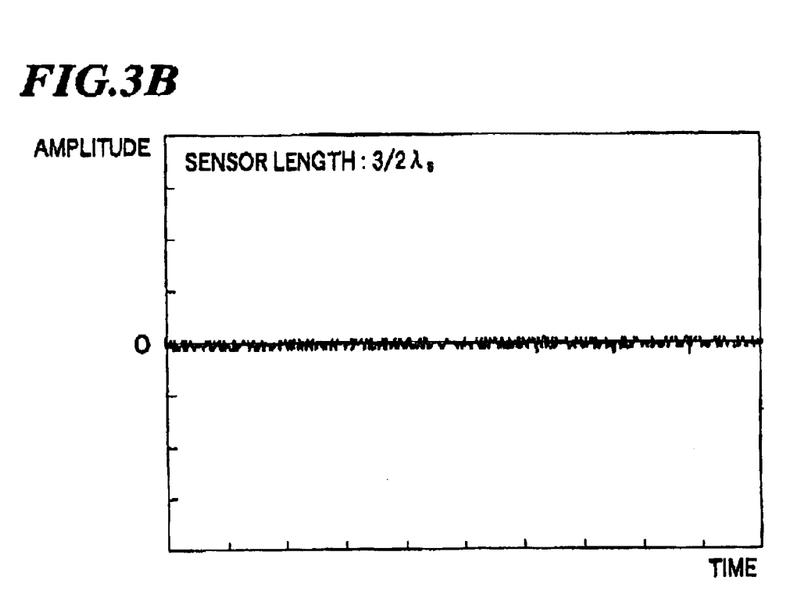

As indicated in FIG. 3A, in the case where the sensor length was ¾ $\lambda_s$, amplitudes of the detection signals could be monitored in response to the applied ultrasonic waves. To the contrary, as indicated in FIG. 3B, in the case where the sensor length is 3/2 $\lambda_s$, substantially no change in amplitudes of the detection signals could be monitored. As a consequence, the following fact could be revealed. That is, when the sensor length is increased, the sensitivity of this sensor is considerably deteriorated.

Next, waveforms of detection signals output from Bragg gratings having different sensor lengths while ultrasonic waves were applied to the Bragg gratings were simulated. In this simulation, the following assumption was made, while 4 sorts of sensors having sensor lengths of ½ $\lambda_s$, ¾ $\lambda_s$, $\lambda_s$, and 3/2 $\lambda_s$ were employed, and also, the ultrasonic waves were applied to these sensors for two time period corresponding to two wavelength of sine wave. Also, another assumption was made. That is, when the ultrasonic wave is applied to each sensor, stress distribution corresponding to intensity of the ultrasonic wave is produced along the sensor length direction, such signal intensity which is directly proportional to averaged stress occurred within each sensor is obtained. The result of this simulation is shown in FIG. 4.

Figure 4:
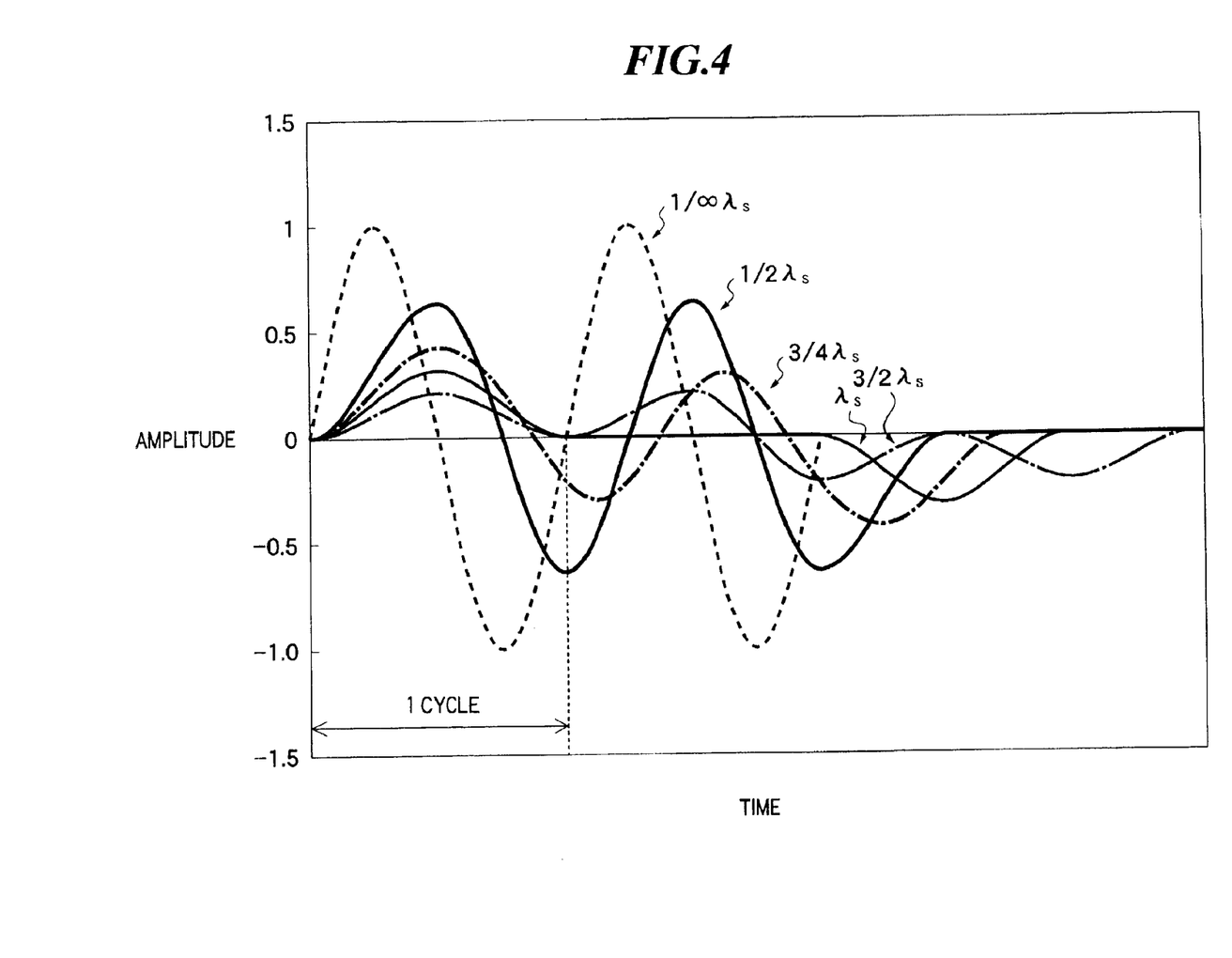
FIG. 4 is a graphic representation for representing simulation results obtained in such a manner that while ultrasonic waves are applied to sensors having different sensor lengths, detection signals output from these sensors are observed.

FIG. 4 graphically shows an ideal waveform of detection signal which is identical to the applied ultrasonic wave having a frequency of 3.5 MHz for two time period in the case where the sensor length is equal to (1/∞) $\lambda_s$, namely infinitesimal. In contrast to this ideal waveform, waveforms of detection signals produced in the case where other sensor lengths shown in FIG. 4 are employed are given as follows: That is, phases of the detection signals are delayed, and amplitudes of the detection signals are decreased in accordance with such a fact that the sensor lengths are increased. Further, when the sensor length is equal to $\lambda_s$, an amplitude of the detection signal continuously becomes zero after detected portion of ½ wavelength. This may be because a state continues in which an averaged value of the amplitudes of the detection signal portions existing in the sensor is zero when the ultrasonic wave propagates through the sensor. In addition, when the sensor length is equal to 3/2 $\lambda_s$, the amplitude of the ultrasonic waves are less than the above-mentioned case, and a waveform of the detection signal has not a similar figure to that of the received ultrasonic wave. Thus, when a sensor length is increased, performance of the sensor is deteriorated. As a result, in order to faithfully represent waveforms of ultrasonic waves containing phases and amplitudes by way of detection signals output from the sensors, the sensor lengths must be shorted up infinitely. However, if a detection signal having an amplitude which is approximately as large as that of the detection signal in the case where the sensor length is equal to ¾ $\lambda_s$ as shown in FIG. 4 can be detected, by obtaining the phase distortion of the detection signal in advance, it is possible to represent the detection waveform of the ultrasonic wave by using the phase distortion. In addition, since in general-purpose ultrasonic receiving apparatus, a detection signal is processed by phase matching process operation and lowpass filter process operations and is converted into ultrasonic images, the received waveform of the ultrasonic wave is not necessarily represented as a waveform of the detection signal when the detection signal is converted into ultrasonic images. For example, when an amplitude of distortion is approximately equal to that of the detection signal in the case where the sensor length is equal to ¾ $\lambda_s$ as shown in FIG. 4, practically no problem exists even if the waveform of the received ultrasonic wave can not be represented. Therefore, if the sensor length is not larger than ¾ $\lambda_s$, such a detection signal required to obtain ultrasonic images can be acquired.

As explained above, in the experimental operations and simulations, when the sensor lengths are long, the waveform distortions of the detection signals are monitored. The reason why such waveform distortions are monitored may be conceived as follows: In this case, referring now to FIG. 5, in such a case where the length of the Bragg grating portion is not less than the wavelength of the ultrasonic wave propagated through the Bragg grating portion, such a portion where expansion/compression of phases are inverted is produced in the Bragg grating portion in a stage where the ultrasonic waves are propagated through the Bragg grating portion. As a consequence, as viewed in the entire sensor portion, such a phenomenon that the expansion/compression of phases are offset may be conceived as this reason.

Figure 5:
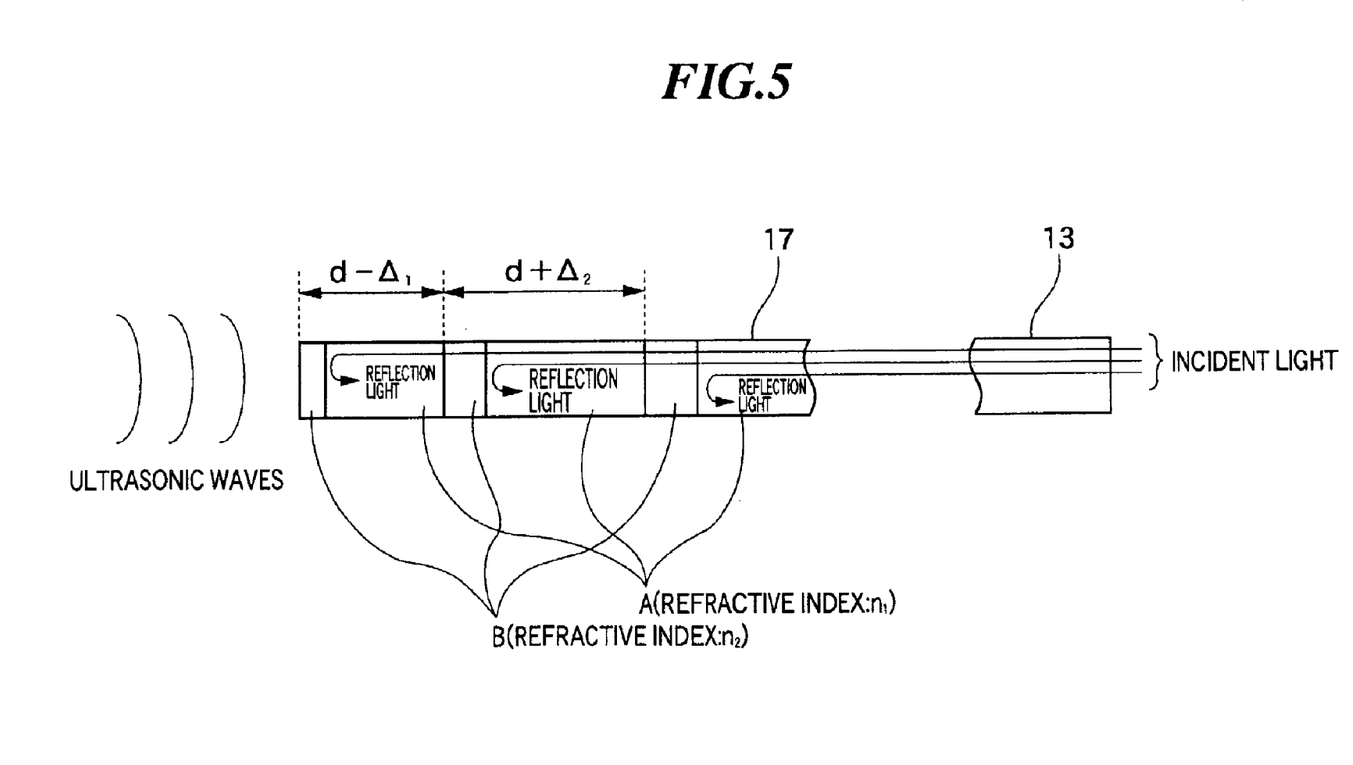
FIG. 5 is a diagram for illustratively showing a basic idea capable of detecting ultrasonic waves by using a Bragg grating.

To avoid an occurrence of such a phenomenon, the length of the Bragg grating portion should be shorter than the wavelength of the ultrasonic wave in the Bragg grating portion, preferably not larger than approximately ¾ thereof or more preferably on the order of ½ thereof. For example, in the case where a frequency of ultrasonic waves to be detected is selected to be 3.5 MHz, and also, a sound velocity of the ultrasonic waves within the material of the Bragg grating portion is equal to 5500 m/s, a wavelength "$\lambda_s$" of the ultrasonic waves propagated through the Bragg grating portion may be calculated as follows:

$$\lambda_s = 5500/(3.5 \times 10^6) = 1571.4 \; (\mu m).$$

As a consequence, an upper limit length of the Bragg grating portion may be calculated as follows:

$$1571 \times (\text{¾}) = 1178.5 \; (\mu m).$$

As a result, assuming now that the length of the Bragg grating portion is shorter than, or equal to 1178.5 $\mu$m, for example, is selected to be approximately 1 mm, the adverse influence caused by the above-described phenomenon such that the expansion/compression of phases are inverted within the Bragg grating portion can be suppressed. Accordingly, the sensor of the Bragg grating portion can have high sensitivities with respect to the ultrasonic waves propagated along, especially, the axial direction of this Bragg grating portion.

Figure 6:
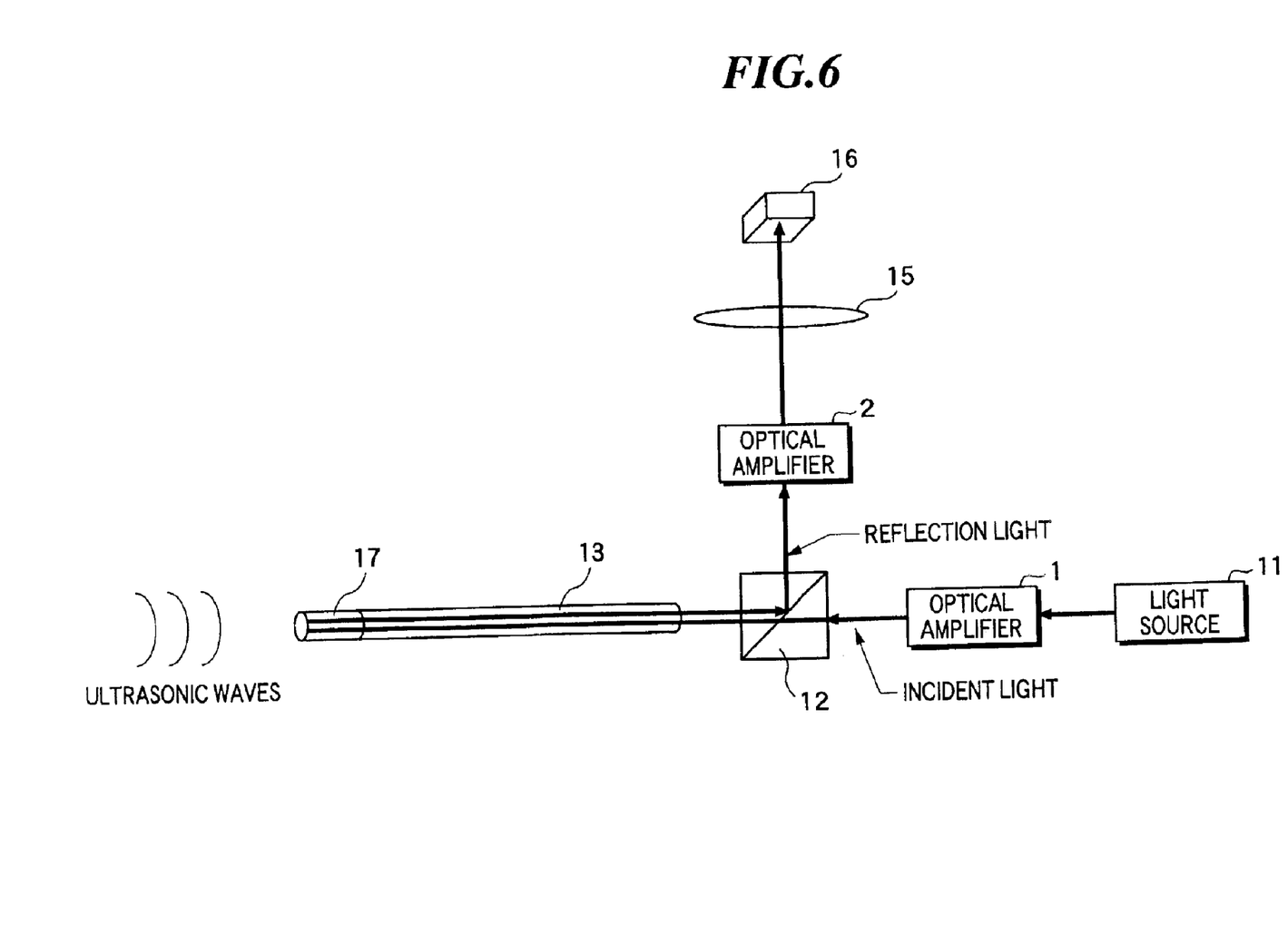
FIG. 6 is a diagram for indicating one modification of the above-described ultrasonic receiving apparatus according to the first embodiment as shown in FIG. 1.

FIG. 6 illustratively shows one modification as to the ultrasonic receiving apparatus according to this first embodiment. This modified ultrasonic receiving apparatus is arranged in such a manner that at least one of an optical amplifier 1 and another optical amplifier 2 is additionally provided with the first ultrasonic receiving apparatus shown in FIG. 1. While the optical amplifier 1 is arranged between the light source 11 and the beam separator 12, this optical amplifier 1 amplifies light entered from the light source 11, and then, projects the amplified light to the beam separator 12. On the other hand, while the optical amplifier 2 is arranged between this beam separator 12 and the image focusing system 15 such as lens, this optical amplifier 2 amplifies light entered from the beam separator 12, and then, projects the amplified light to the image focusing system 15. Alternatively, when the image focusing system 15 is not employed, the optical amplifier 2 is arranged between the beam separator 12 and the photodetector 16, this optical amplifier 2 amplifies the light entered from the beam separator 12, and then, projects the amplified light to the photodetector 16.

As these optical amplifiers, for example, such an optical fiber amplifier EDFA (Er-Doped Optical Fiber Amplifier) into which erbium (Er) has been doped is used. This EDFA may increase intensity of light by approximately 1 digit up to 2 digits.

In the case where such an optical amplifier is arranged between the light source 11 and the optical fiber 13, the intensity of the incident light which is entered into the ultrasonic detecting element 17 is amplified. Also, in the case where such an optical amplifier is arranged between the optical fiber 13 and the photodetector 16, the intensity of the incident light which is entered into the ultrasonic detecting element 17 is not changed, but the intensity of the reflection light which is entered into the photodetector 16 is amplified. In this case, the intensity change of the reflection light which is modulated by the received ultrasonic waves is similarly amplified.

In any cases, since the intensity is amplified under conditions of the light, the light amount of the reflection light which is entered into the photodetector 16 is increased. As a consequence, the adverse influences caused by the electric noise in the photodetector 16 can be reduced, and thus, the S/N ratio of the ultrasonic receiving apparatus can be improved. Furthermore, when both of the above-explained cases are combined with each other, the S/N ratio of the ultrasonic receiving apparatus may be furthermore improved.

Figure 7:
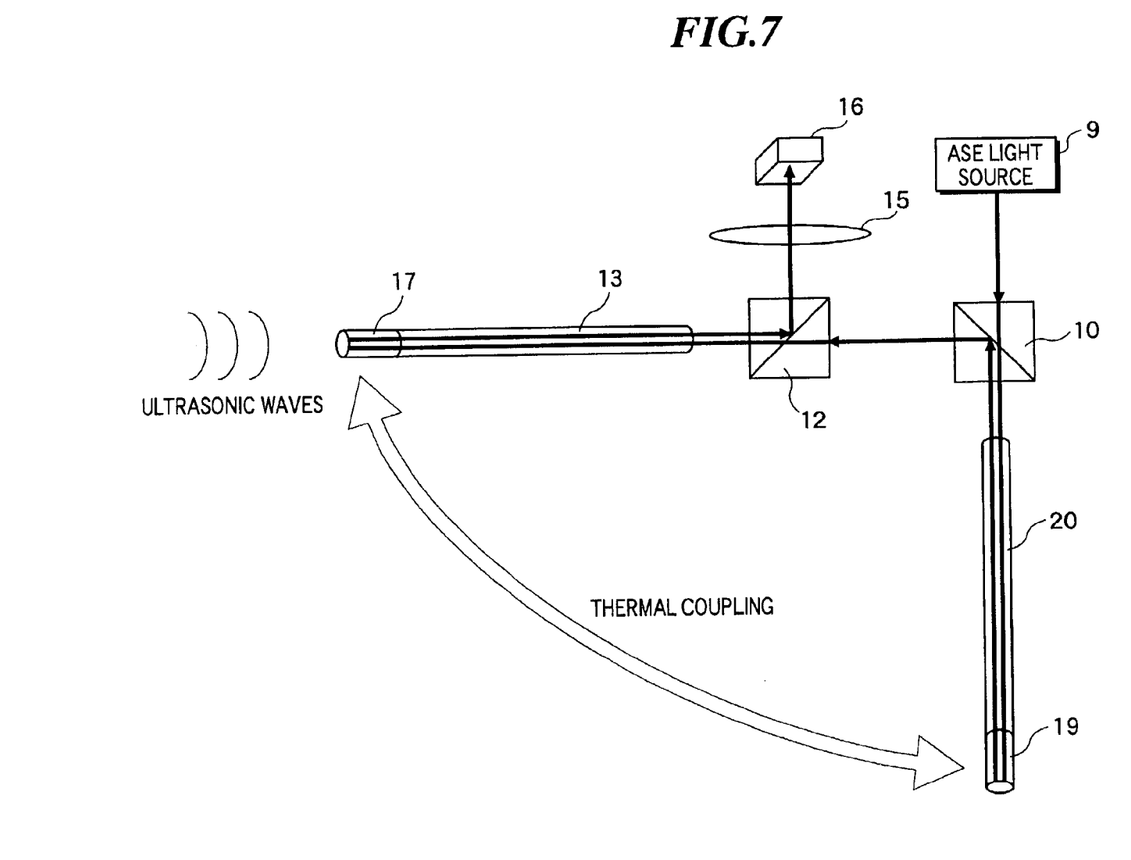
FIG. 7 is a diagram for representing another modification of the above-explained ultrasonic receiving apparatus as shown in FIG. 1.

Referring now to FIG. 7, another modification of the ultrasonic receiving apparatus according to the first embodiment will be explained. This modified ultrasonic receiving apparatus shown in FIG. 7 is featured by that the light source of the first ultrasonic receiving apparatus indicated in FIG. 1 is changed. That is, in the modification example of FIG. 7, light emitted from a broadband light source is filtered by employing a narrowband filter so as to obtain narrowband light.

As the broadband light source, for instance, an ASE (Amplified Spontaneous Emission) light source capable of emitting amplified spontaneous emission light, and a broadband fiber light source may be employed. In FIG. 7, an ASE light source 9 is used as this broadband light source. The ASE light source 9 is manufactured in such a manner that a construction of a broadband optical fiber amplifier is modified, by which amplified spontaneous emission light can be produced. The broadband optical fiber amplifier is described more in detail in, for example, "BROADBAND OPTICAL FIBER AMPLIFIERS" written by H. OGOSHI, The Journal of The Institute of Electronics, Information and Communication Engineers Vol. 82, No. 7, pages 718 to 724, July in 1999.

Figure 8:
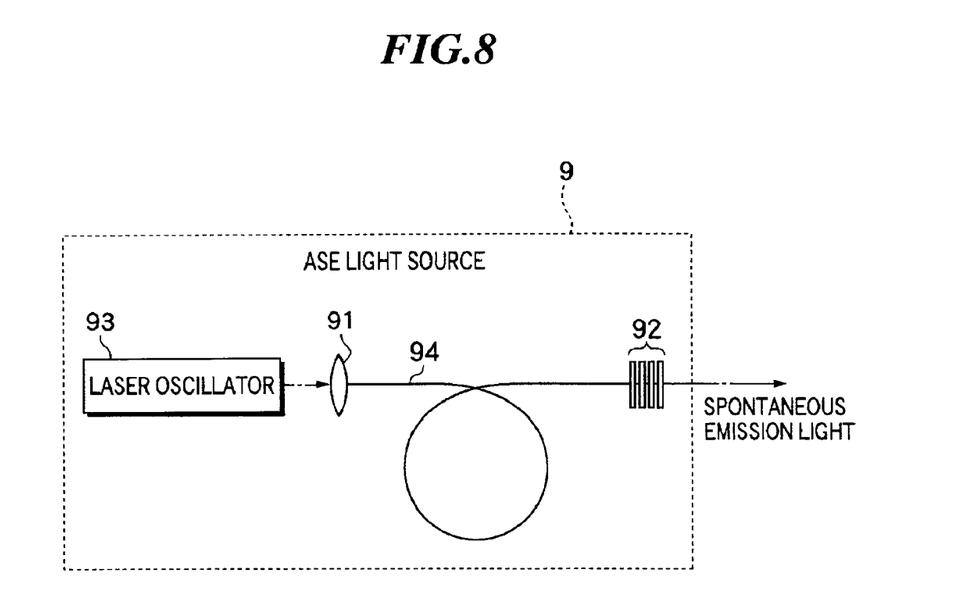
FIG. 8 is a diagram for showing a basic idea of an ASE optical source as shown in FIG. 7.

As shown in FIG. 8, the ASE light source 9 includes an optical fiber 94 for amplifying light. While a lens 91 is mounted on one edge portion of this optical amplifying fiber 94, a Bragg grating portion 92 for reflecting excitation light is formed at the other edge portion thereof. A laser oscillator 93 is arranged as an excitation light source on the left side of the lens 91. The laser light generated from the laser oscillator 93 is entered via the lens 91 to this optical amplifying fiber 94 so as to be amplified. A portion of this amplified laser light passes through the Bragg grating portion 92 as spontaneous emission light.

Referring back to FIG. 7, the light (laser light) emitted from the ASE light source 9 is entered into the beam separator 10. This beam separator 10 may cause the light entered from a first direction to pass therethrough along a second direction, and also may cause reflection light returned from the second direction to pass therethrough along the third direction which is different from the first direction. In FIG. 7, a half mirror is employed as the beam separator 10. Alternatively, an optical circulator and/or a polarization beam splitter may be employed as this beam separator 10.

The light which has been emitted from the ASE light source 9 and then passes through the beam separator 10 is entered into an optical fiber 20. A narrowband filter 19 constructed of a Bragg grating portion is provided at a tip portion of the optical fiber 20. The light entered into the optical fiber 20 is reflected by the Bragg grating portion of the narrowband filter 19, and is again entered into the beam separator 10. The spontaneous emission light produced from the ASE light source 9 passes through this narrowband filter 19, so that the pass-band of this spontaneous emission light is narrowed.

The light reflected by the narrowband filter 19 is again entered into the beam separator 10, so that the travel path of this reflected light is changed, and then, the reflection light is entered into the beam separator 12. The light which has passed through this beam separator 12 is entered into the optical fiber 13, so that this entered light is modulated by the ultrasonic detecting element 17 provided on the tip portion of this optical fiber 13.

In this case, as to the Bragg grating portion, the center wavelength of the reflection light is changed by such a ratio of 0.01 nm/° C. in response to a change in temperatures. As a result, when a light source capable of producing laser light having a single wavelength is employed, the following problem may occur. That is, the sensitivity of the ultrasonic detecting element 17 which is constructed of the Bragg grating portion is largely changed in response to a change in temperatures.

However, as represented in FIG. 7, when the spontaneous emission light generated from the ASE light source 9 is filtered by using the narrowband filter 19 so as to obtain the narrowband light, such a range approximated to the laser light having the single wavelength may be secured, and also, the change in the sensitivities of the ultrasonic receiving apparatus caused by the change in the temperatures can be reduced.

In other words, thermal coupling effects may be achieved by employing the following methods. That is, while both the narrowband filter 19 and the ultrasonic detecting element 17 are manufactured by using the same material, for example, the narrowband filter 19 is coupled to the ultrasonic detecting element 17 by employing such a material having a high thermal conductivity. Alternatively, the narrowband filter 19 is physically located in proximity to the ultrasonic detecting element 17. Furthermore, a heat pipe may be arranged around both the narrowband filter 19 and the ultrasonic detecting element 17.

As a result, since the temperature at the Bragg grating portion of the narrowband filter 19 can become substantially same as the temperature at the Bragg grating portion of the ultrasonic detecting element 17, even when the reflection characteristic of the ultrasonic detecting element 17 is shifted due to the temperature, the wavelength of the light entered into the ultrasonic detecting element 17 is similarly shifted, so that the change in the sensitivities of the ultrasonic receiving apparatus can be reduced.

Figure 9:
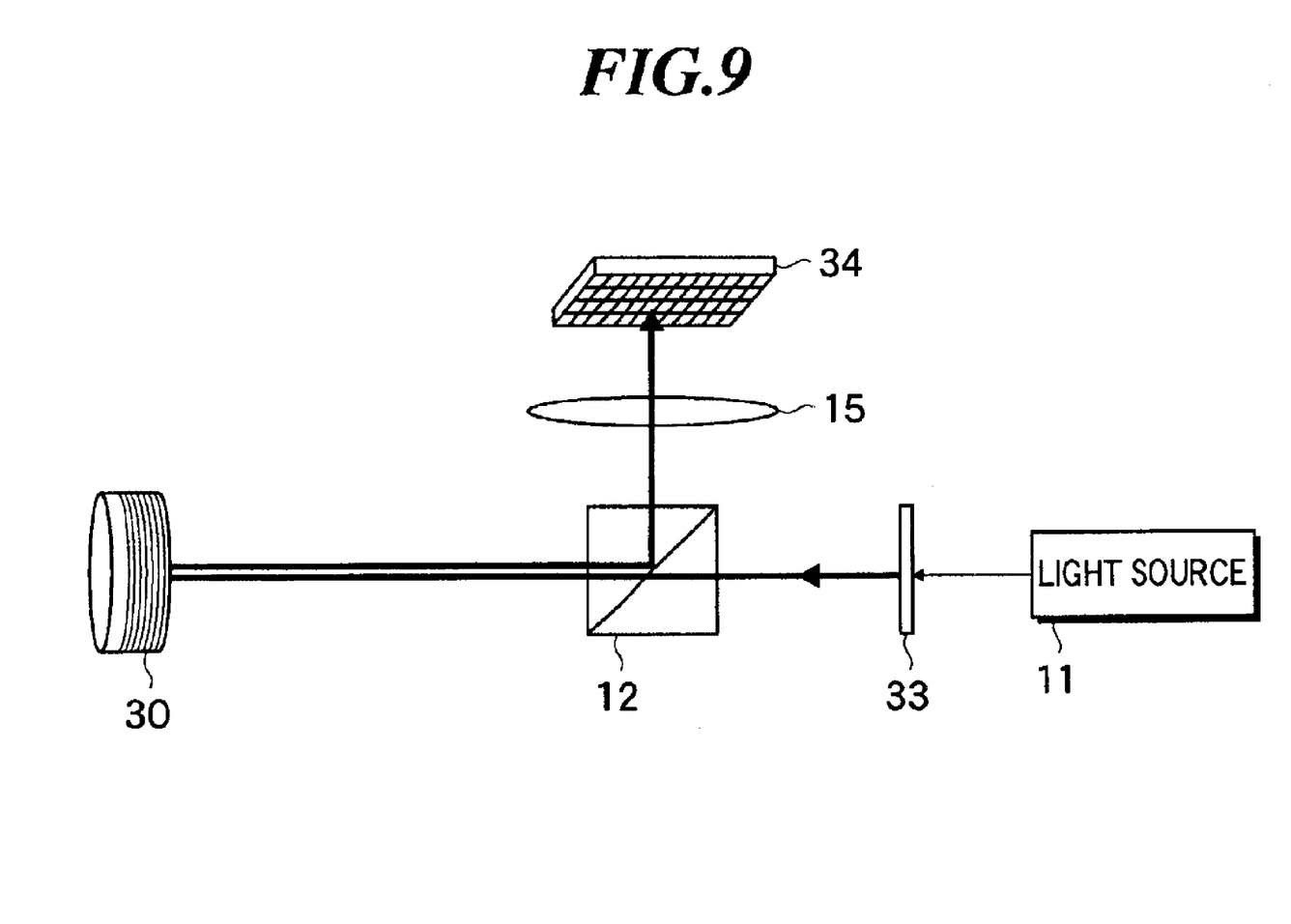
FIG. 9 is a diagram for illustratively indicating a basic idea of an ultrasonic receiving apparatus according to a second embodiment of the present invention.
Figure 10:
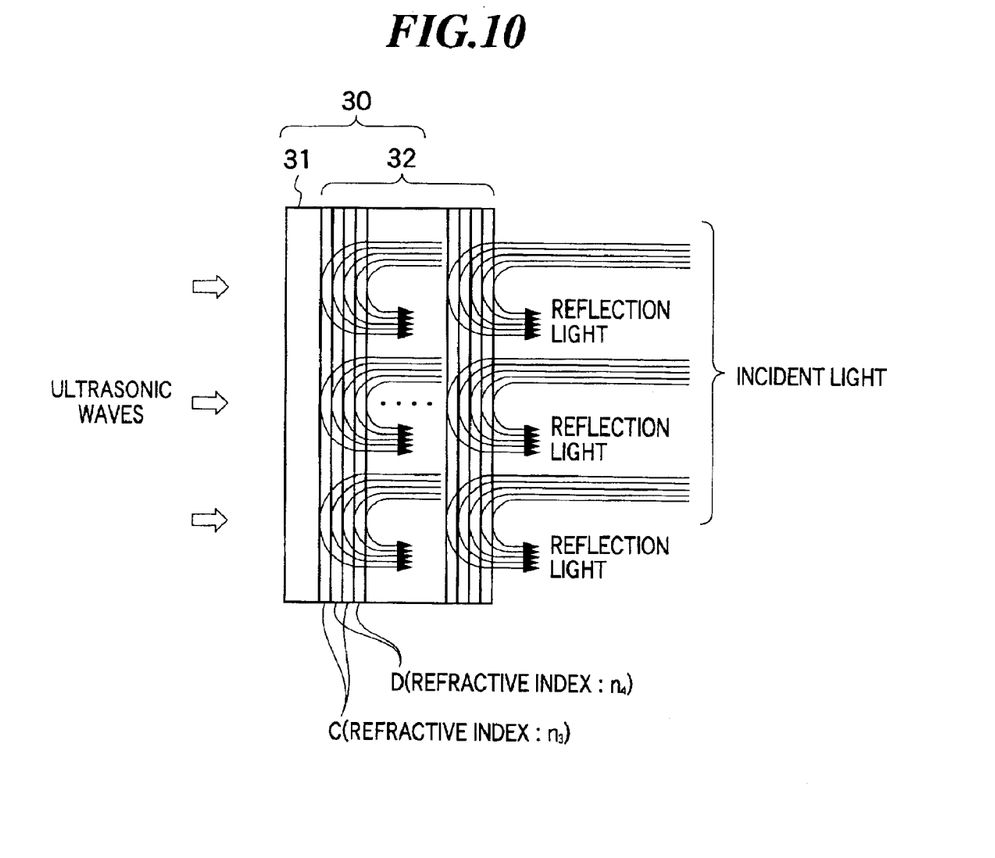
FIG. 10 is a diagram for illustratively showing an ultrasonic detecting element of FIG. 9 in an enlarging manner.

Referring now to FIG. 9 and FIG. 10, an ultrasonic receiving apparatus according to a second embodiment of the present invention will be described. This second ultrasonic receiving apparatus is featured by that the ultrasonic detecting element 17 employed in the ultrasonic receiving apparatus according to the first embodiment of the present invention is replaced by another ultrasonic detecting element (multi-layer film sensor) 30.

FIG. 9 is a diagram for illustratively representing a basic idea as to the ultrasonic receiving apparatus according to this second embodiment. This second ultrasonic receiving apparatus contains as an ultrasonic sensible unit, the ultrasonic detecting element 30 equipped with the Bragg grating structure. While this ultrasonic detecting element 30 contains a circular area having a diameter of approximately 2 cm, or another diameter larger than 2 cm, the ultrasonic detecting element 30 may produce distortions by applying thereto ultrasonic waves.

FIG. 10 illustratively indicates the structure of the ultrasonic detecting element 30 shown in FIG. 9 in an enlarging manner. The ultrasonic detecting element 30 contains a board 31 and a multi-layer film 32, while the multi-layer film 32 is manufactured by alternatively stacking two sorts of material layers having different refractive indexes from each other on the board 31. In FIG. 10, both a material layer "C" having a reflective index of "$n_3$", and another material layer "D" having another refractive index of "$n_4$" are shown. As the board 31, for example, optical glass and the like are employed, for example, quartz glass ($SiO_2$) and BK7 (product name of SCHOTT Company).

As substances employed as the material layer C and the material layer D, it is preferable to combine such materials with each other, the refractive indexes of which are different from each other by not less than 10%. In other words, such substances are selected which can satisfy a relationship of $n_3 \times 1.1 \leq n_4$ in the case where $n_3 < n_4$. This substance selection reason is to obtain high reflectance at a boundary surface between the material layer C and the material layer D. Also, the material layers C and D may be preferably made of substances which may be easily expanded/compressed. This material selection is to increase the distortion amount occurred when the ultrasonic waves are applied to these material layers, and also to eventually increase the system sensitivity. As combination examples of substances capable of satisfying such a condition, $SiO_2$ may be combined with a titanium oxide ($Ti_2O_3$), and $SiO_2$ may be combined with a tantalum oxide ($Ta_2O_5$). For instance, in the former combination case, the refractive index of $SiO_2$ with respect to laser light having a wavelength of 1520 nm is nearly equal to 1.45, whereas the refractive index of $Ti_2O_3$ is nearly equal to 2.0 with respect to this laser light. Accordingly, this may sufficiently satisfy the above-described condition, namely the refractive indexes are different from each other by higher than, or equal to 10%.

A layer thickness (film thickness) of each of these material layers C and D is preferably selected to be approximately ¼ of a wavelength "$\lambda$" of light which is entered into the ultrasonic detecting element 30. In this case, a film thickness implies an optical distance which is expressed by a product defined by multiplying a refractive index (n) of a material layer by a thickness (t) of the material layer. In this case, $nt = \lambda/4$ constitutes the condition. As a result, while a pitch of a periodic structure of the multi-layer film 32 is nearly equal to ½ of a wavelength of incident light, this multi-layer film 32 may selectively reflect such a wavelength component capable of satisfying the Bragg's reflection condition formula (2), and may penetrate therethrough other wavelength components.

Alternatively, while both the material layers C each having the layer thickness of $\lambda/4$ and the material layers D each having the layer thickness of $\lambda/4$ are alternately stacked, either such a material layer C having a layer thickness of $\lambda/2$ or such a material layer D having a layer thickness of $\lambda/2$ may be occasionally stacked.

The above-described material layers "C" and "D" are formed in a multi-layer form (for example, 100 layers of each of materials C/D) on the board 31 by way of the vacuum vapor deposition method, or the sputtering method or the like.

In this case, similar to the first embodiment, also in this second ultrasonic receiving apparatus, the length of the ultrasonic sensible portion, namely, the thickness of the multi-layer film 32 is preferably selected to not larger than ¾ of a wavelength of propagated ultrasonic waves in such a manner that phases of expansions/compressions are made substantially coincident to each other within the sensor.

Such an ultrasonic detecting element was manufactured by using $SiO_2$ as the board, and both $SiO_2$ and $Ti_2O_3$ as the material layers. A total layer number of this multi-layer film 32 was determined as follows. That is, 100 layers of each of these materials were employed, and thus, 200 layers of these materials were stacked in total. When a simulation was carried out under such a condition that laser light was entered into this ultrasonic detecting element, the below-mentioned results could be obtained. That is, as to an inclination of reflectance with respect to a change contained in wavelengths of incident laser light was 2.8 dB/0.01 nm at the reflectance of 25%.

As explained above, since the total layer number of this multi-layer film 32 is increased, the reflectance is increased, and also, the reflectance represents such a steep change with respect to the change contained in the wavelengths, so that the sensitivity of the ultrasonic sensor can be increased.

Referring again to FIG. 9, the laser light emitted from the light source 11 passes through the beam separator 12, and then, is entered into the multi-layer film 32 of the ultrasonic detecting element 30. In this case, the incident laser light may be alternatively enlarged by using a beam expander 33 before this incident laser has passed through the beam separator 12.

On the other hand, when ultrasonic waves are propagated through the ultrasonic detecting element 30, this ultrasonic detecting element 30 is distorted in connection with the propagation of the ultrasonic waves, so that the pitch of the periodic structures of the multi-layer film 32 is changed. Since the wavelength component of the light which is selectively reflected in connection with this pitch variation is also changed, a change contained in the intensity of the reflection light in response to strengths of the ultrasonic waves can be monitored. In this case, since the ultrasonic detecting element 30 receives the ultrasonic waves by way of the face thereof, two-dimensional strength distribution information as to the ultrasonic waves can be acquired.

The light reflected from the ultrasonic detecting element 30 is reflected by the beam separator 12, and then, is entered into the photodetector 34. While the photodetector 34 is such a two-dimensional array detector which is constituted by a plurality of CCDs, or a plurality of PDs, the reflection light is detected for respective pixels. At this time, the reflection light may be directly entered into the photodetector 34, or may be entered via an optical fiber or the like to this photodetector 34. Alternatively, while the image focusing system 15 such as a lens is provided at a post stage of the beam separator 12, the reflection light may be focused onto the photodetector 34 via this image focusing system 15.

The ultrasonic receiving apparatus according to this second embodiment may be apparently modified. That is, similar to the modification as indicated in FIG. 6, the optical amplifiers 1 and 2 may be further employed. Alternatively, similar to another modification as shown in FIG. 7, the broadband light source may be employed for the narrowband purpose. In the latter-mentioned modification, while the ultrasonic detecting element in this second embodiment is employed as the Bragg grating portion of the narrowband filter 19, this ultrasonic detecting element may be thermally coupled to such an ultrasonic detecting element capable of detecting the ultrasonic waves.

In accordance with this second embodiment, since the multilayer film sensor is employed, the ultrasonic waves can be detected in the two-dimensional manner. The cost of such a multi-layer film sensor can be made lower than the cost of such a sensor that fiber Bragg gratings are manufactured in an array form. As a result, the resulting cost required when the two-dimensional sensor is manufactured can be reduced. Also, the multi-layer film is manufactured one layer by one layer by way of the vacuum vapor deposition, or the sputtering method or the like, so that such material members having a large difference between refractive indexes thereof can be selected. As a consequence, the inclination of the reflectance can be increased, and therefore, the sensitivity of this second ultrasonic receiving apparatus can be improved.

Figure 11:
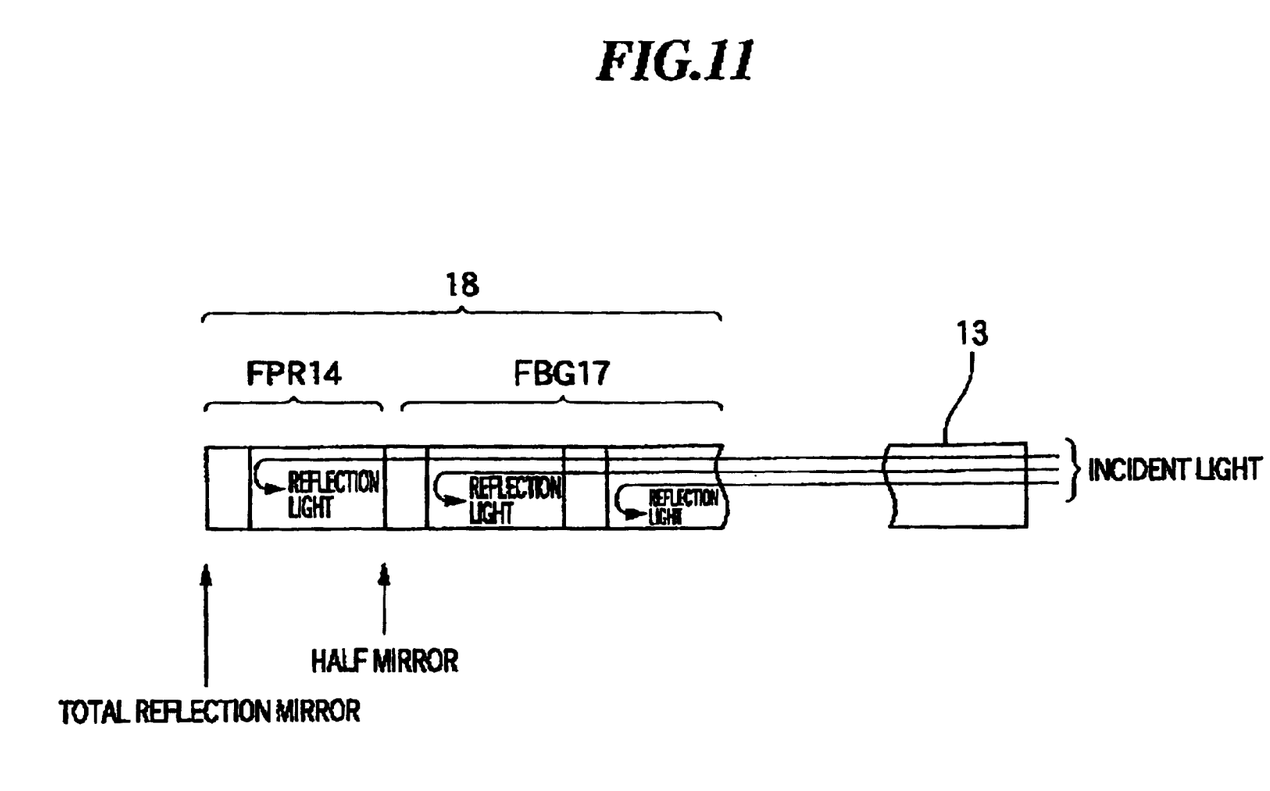
FIG. 11 is a diagram for illustratively indicating a basic idea of an ultrasonic receiving apparatus according to a third embodiment of the present invention.

Referring now to FIG. 11, an ultrasonic receiving apparatus according to a third embodiment of the present invention will be described. This third ultrasonic receiving apparatus is featured by that the ultrasonic detecting element 17 employed in the ultrasonic receiving apparatus according to the first embodiment of the present invention is replaced by another ultrasonic detecting element 18.

As shown in FIG. 11, the ultrasonic detecting element 18 is provided at a tip portion of an optical fiber 13. This ultrasonic detecting element 18 contains both a Bragg grating portion 17 and a Fabry-Perot resonator 14. In other words, the Bragg grating portion 17 is formed at the tip portion of the optical fiber 13, and furthermore, the Fabry-Perot resonator 14 containing a half mirror (right side as viewed in FIG. 11) and a total reflection mirror (left side as viewed in FIG. 11) is formed at a portion in front of the above-explained tip portion. Also, in this third embodiment, in order that an adverse influence caused by expansions/compressions of phases is suppressed, it is assumed that a length of an ultrasonic sensible portion containing both the Bragg grating portion 17 and the Fabry-perot resonator 14 may be selected to not to be larger than ¾ of a wavelength of ultrasonic waves propagated through this ultrasonic sensible portion, preferably, selected to be approximately ½ of this wavelength.

Now, a Fabry-Perot resonator will be explained. That is, this Fabry-Perot resonator is manufactured as follows. While a half mirror is formed on a tip portion of a single mode optical fiber by vapor-depositing gold or the like, a cavity made of polyester resin, or the like is formed at a tip portion of this half-mirror-forming portion. Furthermore, a total reflection mirror is formed at a tip portion of this cavity-forming portion by vapor-depositing gold or the like. The material member for forming this cavity may receive geometrical displacement by applying ultrasonic waves to this material member.

In the case where detection light is entered from the half mirror side into this Fabry-Perot resonator and also ultrasonic waves are applied to this Fabry-Perot resonator from the total reflection mirror side, since the optical path length of the cavity is changed based upon sound-pressure changes of the ultrasonic waves, intensity of light which is reflected by the Fabry-Perot resonator is changed. As a result, since this light intensity change is converted, intensity of the ultrasonic waves can be measured. This Fabry-Perot resonator owns such a feature that since the length of the sensor is short, resolution of this sensor along the axial direction thereof may become high.

When such a Fabry-Perot resonator 14 is employed to be combined with the Bragg grating portion 17, the light which is not reflected by this Bragg grating portion 17 can be reflected by the Fabry-Perot resonator 14.

As previously described in detail, according to the present invention, since the length of the ultrasonic sensible portion is limited on the basis of the wavelength of the ultrasonic waves propagated through this ultrasonic sensible portion, such an ultrasonic receiving apparatus having the higher sensitivity with respect to, especially, the ultrasonic waves propagated along the axial direction of this ultrasonic sensible portion can be realized, while suppressing the adverse influence caused by such a phenomenon that the expansions/compressions of the phases are inverted in this ultrasonic sensible portion. As a consequence, there are many possibilities that two-dimensional sensors, ultrasonic diagnosing apparatus or the like by using such an ultrasonic receiving apparatus may be realized.

What is claimed is:

1. An ultrasonic receiving apparatus comprising:

an ultrasonic detecting element for modulating light on the basis of ultrasonic waves applied thereto, said ultrasonic detecting element including an ultrasonic sensible portion having a length not larger than ¾ of a wavelength of ultrasonic waves propagated therethrough; and a photodetector for detecting light output from said ultrasonic detecting element.

2. An ultrasonic receiving apparatus according to claim 1, wherein:

said ultrasonic sensible portion has a Bragg grating structure.

3. An ultrasonic receiving apparatus according to claim 1, wherein:

said ultrasonic detecting element includes a fiber Bragg grating formed on a second edge portion of an optical fiber having a first edge portion into which light is entered.

4. An ultrasonic receiving apparatus according to claim 3, wherein:

said optical fiber corresponds to a single mode fiber.

5. An ultrasonic receiving apparatus according to claim 1, wherein:

said ultrasonic detecting element includes a multi-layer film formed by alternatively staking two sorts of materials thereon, while said two sorts of materials own different refractive indexes from each other.

6. An ultrasonic receiving apparatus according to claim 5, wherein:

said two sorts of materials have refractive indexes which are different from each other by at least 10%.

7. An ultrasonic receiving apparatus according to claim 5, wherein:

a layer of each of said materials which form said multi-layer film includes a layer having a film thickness substantially equal to ¼ of a wavelength of light incident upon said multi-layer film.

8. An ultrasonic receiving apparatus according to claim 6, wherein:

a layer of each of said materials which form said multi-layer film includes a layer having a film thickness substantially equal to ¼ of a wavelength of light incident upon said multi-layer film.

9. An ultrasonic receiving apparatus according to claim 7, wherein:

a layer of each of said materials which form said multi-layer film furthermore includes a layer having a film thickness substantially equal to ½ of a wavelength of light incident upon said multi-layer film.

10. An ultrasonic receiving apparatus according to claim 8, wherein:

a layer of each of said materials which form said multi-layer film furthermore includes a layer having a film thickness substantially equal to ½ of a wavelength of light incident upon said multi-layer film.

11. An ultrasonic receiving apparatus according to claim 1, further comprising:

an optical amplifier for amplifying light generated from a light source to enter the amplified light into said ultrasonic detecting elements.

12. An ultrasonic receiving apparatus according to claim 1, further comprising:

an optical amplifier for amplifying light output from said ultrasonic detecting element to enter the amplified light to said photodetector.

13. An ultrasonic receiving apparatus according to claim 1, further comprising:

a light source for generating single mode laser light having wavelengths of 500 nm to 1600 nm.

14. An ultrasonic receiving apparatus according to claim 1, further comprising:

a broadband light source; and a narrowband filter for filtering the broadband light generated from said broadband light source so as to obtain narrowband light.

15. An ultrasonic receiving apparatus according to claim 14, wherein:

said broadband light source corresponds to an ASE (Amplified Spontaneous Emission) light source which emits amplified spontaneous emission light.

16. An ultrasonic receiving apparatus according to claim 14, wherein:

said narrowband filter has a Bragg grating structure which is constituted by the same material as that of the Bragg grating structure of said ultrasonic detecting element; and said Bragg grating structure of the narrowband filter is thermally coupled to the Bragg grating structure of said ultrasonic detecting element.

17. An ultrasonic receiving apparatus according to claim 1, wherein:

said photodetector includes any one of a CCD (charge-coupled device), an MOS (metal-oxide-semiconductor) type sensor and a photodiode.

* * * * *